Figure 3:
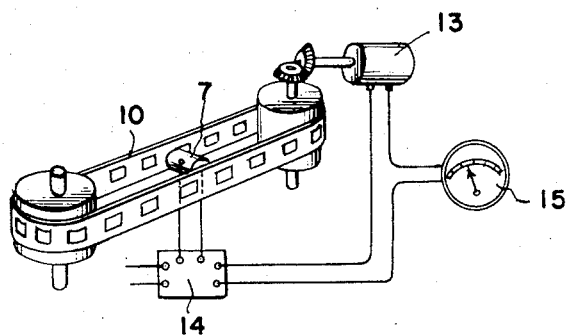

March 24, 1959 G. WOHLER 2,879,054
APPARATUS FOR DETERMINING RATES OF CHANGE IN WEIGHT
Filed May 21, 1954 4 Sheets-Sheet 1
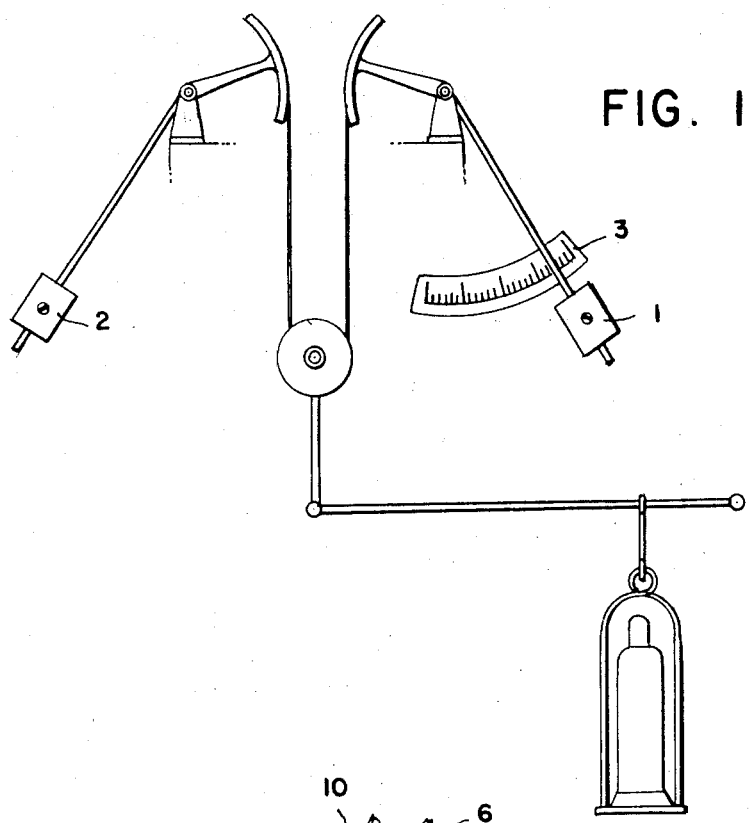
FIG. 1
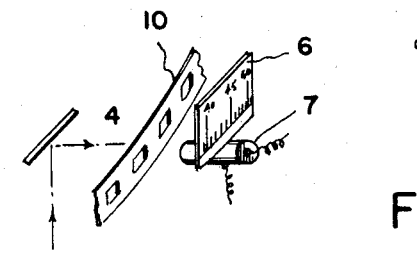
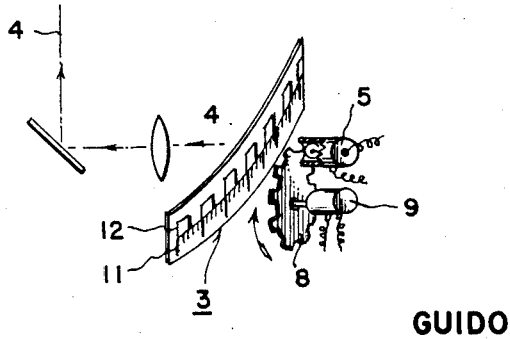
FIG. 2
INVENTOR
GUIDO WOHLER March 24, 1959 G. WOHLER 2,879,054
APPARATUS FOR DETERMINING RATES OF CHANGE IN WEIGHT
Filed May 21, 1954 4 Sheets-Sheet 2

INVENTOR
GUIDO WOHLER

March 24, 1959 G. WOHLER 2,879,054
APPARATUS FOR DETERMINING RATES OF CHANGE IN WEIGHT
Filed May 21, 1954 4 Sheets-Sheet 4

INVENTOR
GUNDO WOHLER

BY Wenderoth, Lind & Ponack
ATTORNEYS

United States Patent Office 2,879,054
Patented Mar. 24, 1959

2,879,054

APPARATUS FOR DETERMINING RATES OF CHANGE IN WEIGHT

Guido Wohler, Zurich, Switzerland, assignor to Ciba Limited, Basel, Switzerland, a Swiss firm Application May 21, 1954, Serial No. 431,508

Claims priority, application Switzerland May 22, 1953

5 Claims. (Cl. 265—27)

In carrying out chemical reactions it is almost always necessary to react the components together in certain proportions, and it is very often necessary to add one of the components to the reaction mixture at a predetermined rate. While there is generally no difficulty in the case of liquid or solid components to control both the total quantity of a component to be added and also the rate at which it is added, difficulties sometimes arise in the case of reactions in which a gas is to be introduced into the reaction mixture. In the case of gases which, for example, are derived from a pressure vessel, it is usually easy by weighing the vessel to determine the quantity of gas that has been introduced into the reaction mixture. However, it is often difficult to determine the rate at which the gas is being introduced at any given moment. Measuring instruments are indeed known which indicate with sufficient accuracy the speed of flow of the gas. However, these instruments depend on measurement of the volume of the gas. In cases in which the pressure and temperature of the gas cannot be kept constant, measurements of volume afford no indication of the rate of supply of the gas with respect to its weight.

The present invention provides an apparatus, which can be used in conjunction with known weighing devices, and which enables rates of change in weight to be determined. Since, for the reasons stated above, it is generally necessary to use a weighing device for accurately determining the total quantity of the gas which has entered into reaction, the present invention affords the great advantage of providing an additional relatively simple apparatus which also enables the rate of supply of the gas to be determined.

This invention provides apparatus for determining rates of change in weight, which comprises a weighing device having a movable scale provided with a series of areas of equal light transparency and of uniform width and spacing in the direction of movement of the scale, a movable diaphragm provided with a series of light transparent areas corresponding in width and spacing to those of the scale, or to their projections, respectively, a photo-electric cell upon which light is incident in a quantity dependent on the extent of overlap of superposed images of the areas of the scale and of the diaphragm incident upon the cell, and means responsive to changes in the electric current from the cell for bringing the speed of the diaphragm into synchronism with the speed of the scale when a change in the said current occurs.

As weighing devices having a movable scale there come into consideration, for example, those of the kind in which a movable scale moves past or moves beneath a reading window having a mark, or more especially those in which a movable scale, which in this case may be very small, is projected by an optical system on a suitable screen or in another manner. It will be understood that various lenses or mirrors may be interposed in order to obtain a large output of light for enlarging the image or favorably influencing the light path.

For the purposes of this invention a special scale is used which contains a series of areas transparent to light upon a substantially opaque ground. These areas must be of the same width and spaced at the same distances apart in the direction of movement of the scale. In one form of diaphragm to be described hereinafter the transparent areas may have a special shape, for example, a trapezoidal form, and the transparent areas of the scale will then be similarly shaped.

This special scale consisting of transparent areas on a dark ground may be placed adjacent to a graduated scale which it is also of advantage to provide. The image of the graduated scale may be projected on to a reading screen so that normal readings of weight can be made with the weighing device, and the light passing through the transparent areas of the special scale is arranged to fall upon the movable diaphragm, so that when the transparent areas of the diaphragm overlap the images of the black and white areas a part of the light continues along the path to the cathode of the photo-electric cell. This degree of overlap, and consequently the quantity of light reaching the cathode, remains constant when the speeds of the scale and the diaphragm are the same, but change when these speeds differ from each other.

The aforesaid special scale may consist in its simplest form of a single series of black and white strips of equal width. However, the transparent areas may be of a different form, and it is by no means essential that the widths of the transparent areas on the scale should be the same as the widths of the intervening black parts of the scale. In general, however, a favorable light output is obtained if all the black and transparent areas are approximately of the same width.

The movable diaphragm must correspond to the scale used in such a way that during the movement of the diaphragm, it is possible for the superposed images of the transparent areas of the scale and of the diaphragm, which are incident upon the photo-electric cell, to overlap each other to varying extents. The diaphragm must also be so designed that the distances between the light-transmitting areas of the scale in the projected image coincide with the distances between the light-transmitting areas of the diaphragm.

There may be used as the diaphragm, for example, an endless film strip which is moved past the photo-electric cell. Another form of diaphragm is a rotating screw having a very deep thread. It is then of advantage that the edges of the black and white areas of the scale should correspond exactly to the profile of the thread. A diaphragm constructed in this manner in the form of a continuously rotating screw has the advantage of robustness and accuracy, since it can be driven with a minimum of play.

The movable diaphragm is driven, for example, by an electric motor of which the rate of revolution is variable. Advantageously there is used an electric motor having a simple characteristic, and in many cases it is desirable to use an eddy current motor which is also known as a Ferraris motor, because at a constant excitation voltage of the coils the rate of revolution has a practically linear relationship to the strength of the current over a wide range.

The invention depends on the fact that the magnitude of the photo-electric current produced in the photo-electric cell, for example, after passing through a suitable amplifier, so regulates the speed of the diaphragm that it moves at the same speed as the scale of the weighing device which is influenced by the change in weight. The speed of the movement reproduced by the diaphragm can then be measured in any desired manner.

The following is a description of the operation of one example of apparatus in accordance with the invention:

A beam of light incident upon a photo-electric cell corresponds to the width of at least one or several of the divisions of the black-and-white areas of the scale of the weighing device. This beam of light is, however, partially obscured by the diaphragm located in front of the photo-electric cell due to the fact that the transparent areas of the diaphragm overlap the images of the transparent areas of the scale. So long as the speeds of the diaphragm and the scale are the same, this degree of overlap remains constant. When the photo-electric current is strong the diaphragm moves faster than the scale, and the diaphragm obscures the light beam to a greater extent. Consequently, the photo-electric current becomes weaker until the scale and the diaphragm move synchronously. On the other hand, when the photo-electric current is small, the diaphragm moves more slowly than the scale and obscures the light beam to a lesser extent. Consequently, the photo-electric current increases until the diaphragm attains the speed of the scale.

The use of an eddy current motor or Ferraris motor to drive the diaphragm has the advantage that the rate of revolution of the motor is a linear function of the strength of the current. Since the rate of revolution of the diaphragm, in the steady condition, is also a linear function of the rate of change in weight, the intensity of the current is in this case a linear function of the rate of change in weight.

In order to avoid the difficulty attendant upon amplifying continuous voltages or continuous currents and to avoid stability difficulties in the amplifier, it is of advantage to interrupt the light beam projected from the scale on to the diaphragm, for example, by means of a stroboscopic disc. In this manner there is produced directly in the photo-electric cell an alternating current or alternating voltage. In order to avoid disturbances it is of advantage to use for driving the stroboscopic disc a synchronous motor of which the rate of revolution remains constant with respect to the frequency of the mains used. At a mains frequency of 50 cycles per second the light beam may be interrupted at the rate of 100 cycles per second. The amplified alternating current is then advantageously rectified and filtered through an electric filter, which allows only very low frequencies to pass through it, and the resulting current is then used to control the drive. The said filter has, in addition to smoothing out the undulations caused by the stroboscopic disc, the function of rendering harmless fluctuations of short duration of photo-electric current due to vibration of the apparatus. For this purpose the said filter is advantageously given a time constant of more than 0.1 second, for example, 1 to 20 seconds depending on the speed to be measured.

Amplification of the relatively very small currents or voltages produced by the photo-electric cell may be brought about by means of known amplification circuits. There is no difficulty in so dimensioning the amplifier as to give the output required to drive a small motor. Known means may be used for counteracting fluctuations in the mains voltage, if this is necessary or is desired for high accuracy.

At the beginning of the operation or after disturbances due to movements of the weighing device it may happen that the relative positions of the scale and the diaphragm are very far removed from the steady condition. Since strength of the current is a measure of the rate of change in weight only when the apparatus is in a state of dynamic equilibrium, it is desirable that this steady condition should be attained as rapidly as possible. A large deviation from the steady condition produces either a very weak current or a very strong current. By the use of a minimum and maximum current relay an additional rapid motion can be released, which brings the diaphragm within the vicinity of the state of equilibrium in a short time.

Furthermore, there may be provided a counter mechanism operated by the means for driving the diaphragm and arranged to close through a relay a valve controlling the supply of the gas, when a predetermined total quantity of gas has been supplied.

It is also possible with the apparatus of this invention to regulate the gas flow automatically. For this purpose an integrating control system is most advantageous.

An integrating control system may, for example, be as follows:

A motor, of which the rate of revolution can be varied, drives a screw-threaded rod. On the rod is mounted a nut, which is rotated in the same direction as the drive of the diaphragm. The rate of revolution of the motor is adjusted in accordance with the desired quantity of gas to be supplied in unit time. If the rate of supply of gas is too low the nut rotates more slowly than the screw-threaded rod, and the nut therefore moves towards the motor and opens the valve through an adjusting ring and lever. If the rate of supply of gas is too high the nut rotates faster than the screw-threaded rod, so that the nut moves away from the motor and closes the valve.

Another modification comprises, for example, a valve driven by a direct current motor. A potentiometer, which is supplied from a source of direct current, is used to adjust the voltage of the current to a control voltage which corresponds to the desired rate of change in weight. Upon the control voltage is impressed the rectified voltage from the photo-electric cell. The difference in voltage is used to drive through an amplifier a motor that changes its direction of rotation when the voltage is reversed and controls the valve. If the rate of supply of gas is momentarily too high the voltage of the photo-electric cell is higher than the control voltage. The motor then rotates in one direction and closes the valve. If the rate of supply of gas is too low the voltage of the photo-electric cell is lower than the control voltage, and the motor opens the valve.

Figure 4:
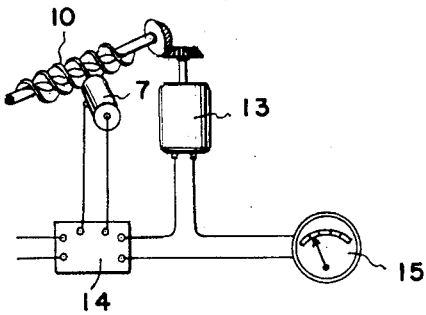
Figure 5:
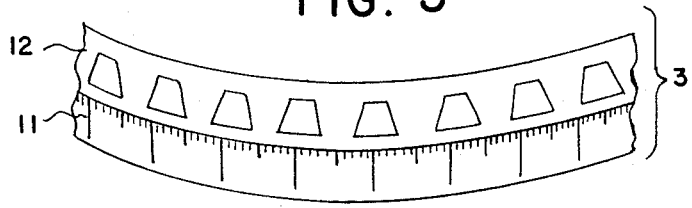
Figure 6:
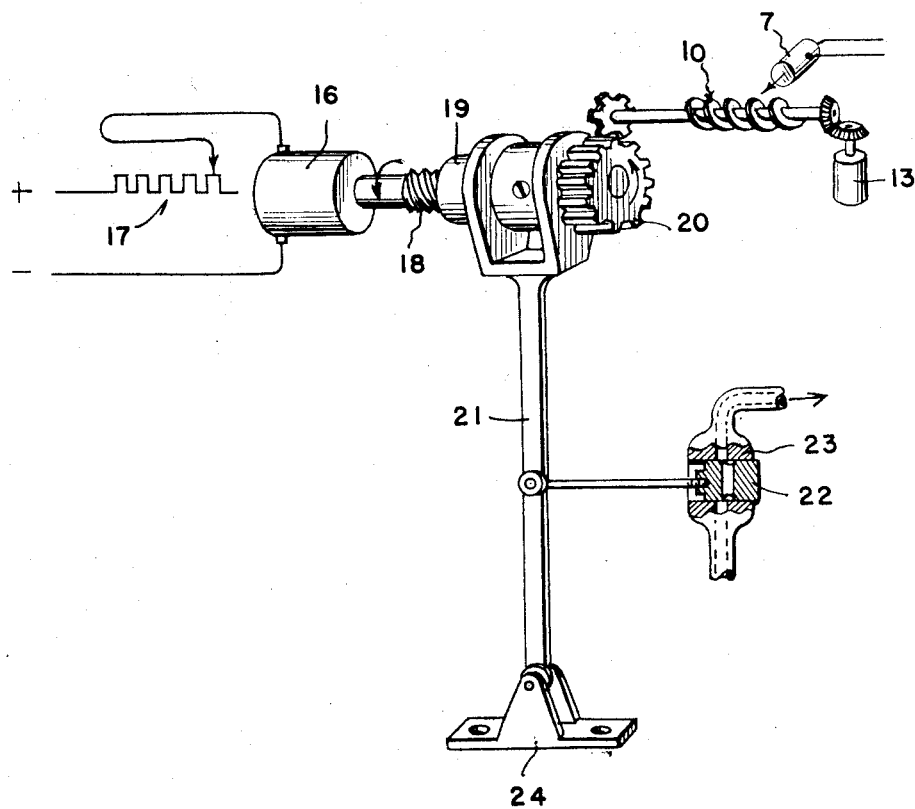
Figure 7:
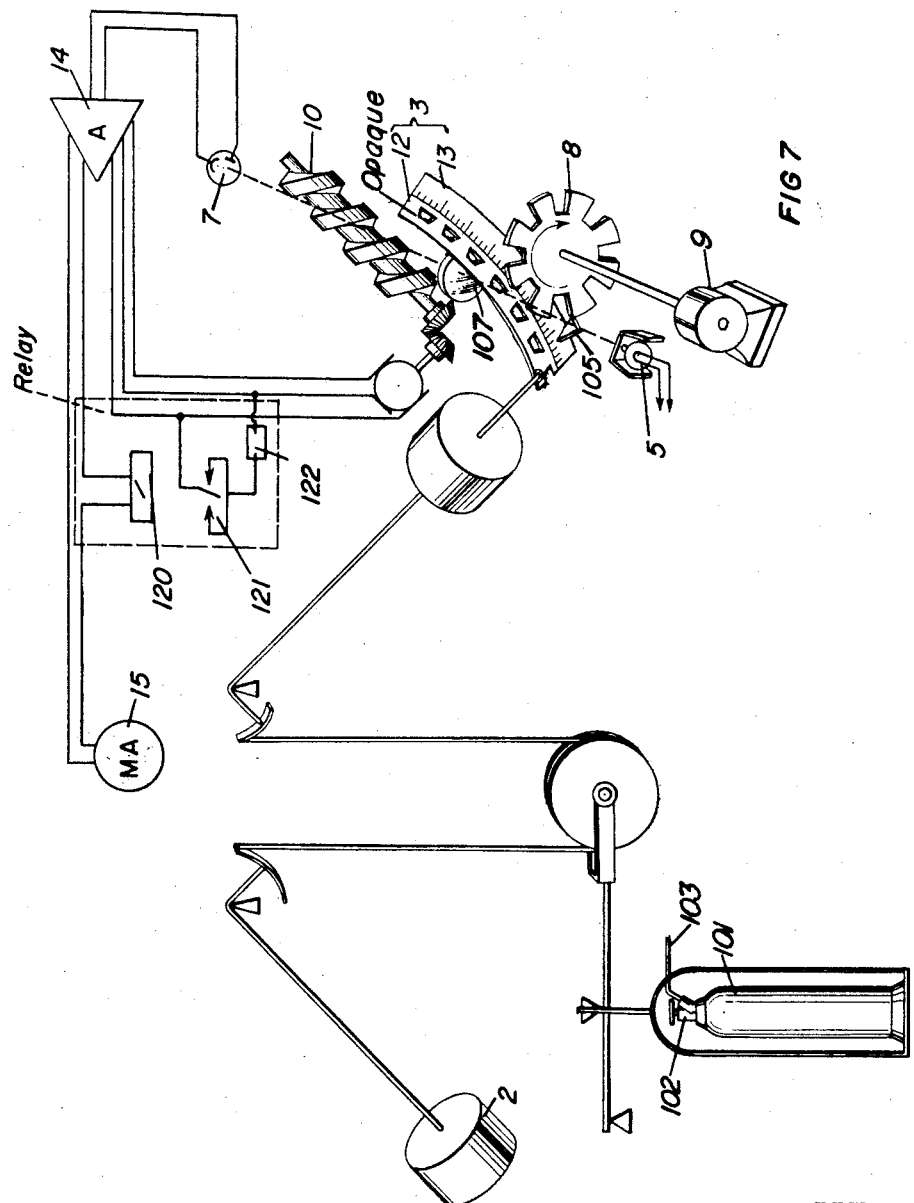

Apparatus constructed in accordance with the invention and operating in the manner described above is shown by way of example in the accompanying drawings, in which Fig. 1 shows diagrammatically a weighing device having a movable scale, Fig. 2 is a diagrammatic representation of the path of the light rays during the projection of the movable scale, Figs. 3 and 4 are diagrammatic representations of two forms of diaphragm, Fig. 5 shows diagrammatically a scale for use with a diaphragm constructed like a screw, Fig. 6 is a diagrammatic representation of an integrating control mechanism, and Fig. 7 is a diagrammatic representation of a complete apparatus according to the invention.

In Fig. 1 the weighing device has two pendulums 1 and 2, of which the degree of displacement corresponds to the weight of the load. A scale 3 is fixed to the pendulum 1.

As shown in Fig. 2, one half of the movable scale 3 is provided with a graduated scale 11 which is projected with the aid of a light source 5 along the path 4 on to a matt screen 6 for normal weight readings. The other non-graduated scale 12 is projected on to the photo-electric cell 7. A stroboscopic disc 8 breaks up the light rays at a constant rate and is driven by a synchronous motor 9. 10 is the diaphragm.

In the completely assembled apparatus, as shown in Fig. 7, gas bottle 101 is suspended on the weighing apparatus of Fig. 1. If gas is allowed to escape through valve 102 and hose 103, scale 3 will move with a velocity corresponding to the rate of flow of the gas. Scale 3 supports the diaphragm 12 which has therein the uniformly spaced areas of equal light transparency, the areas being of uniform width.

A graduated scale 11 moves together with the scale cantilever and is read by the aid of a stationary index 105. This is merely the index and scale of Fig. 1, in which an index moves together with the cantilever along a stationary scale. Both cases, i.e. movable scale and stationary index, or movable index and stationary scale, are equivalent. All that is essential is that a movable diaphragm 12 be provided.

This movable diaphragm 12 is firmly connected to a part of the weighing device moving in correspondence with the change of weight. Diaphragm 12 cooperates with a screw 10 the deep and wide threads of which are so formed and arranged that the free interstices between adjoining threads thereof form passages for the light representing a similar series of transparent and opaque areas. This cooperation is effected by an optical arrangement comprising a light source 5, a photocell 7 and a lens system 107 interposed between the two diaphragms. This lens serves to form an image of diaphragm 12 but may be dispensed with if the diaphragm and screw are sufficiently close together so that the light may pass directly through both of them. Screw 10 is supported rotatably in such a manner that by rotating screw 10 the interstices seem to move along the screw in the same direction and sense as diaphragm 12. Screw 10 is driven by a motor 13 through a gearing 110. Motor 13 is connected to the output terminals of an amplifier 14 to the input of which photocell 7 is connected. The current flowing through motor 13 is indicated by an instrument 15. In order to provide alternating current in the circuits of photocell 7, amplifier 14 and motor 13 the light issuing from light source 5 passes through the stroboscopic disc 8 driven by a constant speed motor 9.

It is obvious that motor 13 will have the tendency to make a screw 10 move with the same speed as diaphragm 12. In case of synchronism of movement the transparent areas of screw 10 and diaphragm 12 will not be fully in register. They will leave an opening of such size that the light impinging upon photocell 7 is sufficient to make motor 13 rotate with a speed required to uphold synchronism of motion. The current indicated by instrument 15 is a measure of the speed of the motor and consequently a measure for the rate of change of weight of the gas bottle on the weighing device, i.e. of the rate of flow of the gas. A maximum and minimum relay 120 is inserted into the output circuit of amplifier 14 in series with instrument 15 which will close contacts 121 whenever the output current exceeds or falls below a given range. This contact when closed puts a shunt 122 in parallel with the field windings of motor 13, thereby causing rapid motion of motor 13 until the desired corresponding position of screw 10 and diaphragm 12 is attained. Then the output current falls or rises again to the normal value, the relay is opened and the regular operation of the device is resumed.

Fig. 3 shows a diaphragm 10 in the form of a film. The current of the photo-electric cell 7 is amplified by an amplifier 14 and measured by an ammeter 15. The amplified current is supplied to a motor 13, which drives the diaphragm 10.

Fig. 4 shows a diaphragm 10 in the form of a screw. The ammeter 15 may be calibrated to give a direct reading of the rate of change in weight.

Fig. 6 shows one form of integrating control mechanism. 7 is the photo-electric cell, 10 the diaphragm and 13 the driving motor. A toothed wheel 20 rotates a nut 19 in the same direction as a motor 16 rotates a screw-threaded rod 18. A resistance 17 controls the speed of revolution of the motor 16. A lever 21 pivoted to the support 24 moves the piston 22 of a valve 23 in accordance with the lateral displacement of the nut 19.

When the speed of rotation of the nut 19, and correspondingly the speed of the diaphragm 10, is the same as that of the screw-threaded rod 18 the position of the piston 22 remains constant. When the nut rotates faster than the rod the valve closes, and when it rotates more slowly than the rod the valve opens.

What is claimed is:

1. Apparatus for determining rates of change of weight, comprising in combination a weighing device having a part movable with the change of weight of the object to be weighed, a first diaphragm on said movable part having a series of areas of equal light transparency and of uniform width, said areas being uniformly spaced from each other, a second diaphragm having a similar series of areas and being movable in the same direction as said first diaphragm, a light source positioned so that the light from the source passes through the transparent areas of both diaphragms in a quantity dependent upon the overlap of the transparent areas of both diaphragms, a photocell positioned to receive the light from said light source after it has passed through said areas, means electrically connected to said photocell and responsive to changes in the electric output of said photocell and connected to said second diaphragm for driving said second diaphragm and bringing into synchronism the motion of the second diaphragm with the motion of the first diaphragm, and further means connected to said responsive means for indicating the speed of motion of said second diaphragm and thereby indicating the rate of change of weight on said weighing apparatus.

2. An apparatus as claimed in claim 1, wherein a minimum and maximum relay is connected to said means responsive to the electric output of the photocell for imparting a rapid motion to the driving means of the diaphragm whenever the photo-electric current falls below a minimum or exceeds a maximum.

3. Apparatus as claimed in claim 1 wherein the means responsive to changes in the electric output of said photocell comprises an amplifier and an electric motor driven by the output of the amplifier, and said further means comprises a meter measuring the electric current flowing through said motor for indicating the speed of rotation thereof and thereby indicating the rate of change of weight on said weighing apparatus.

4. An apparatus as claimed in claim 3, wherein the said motor is an eddy current motor.

5. Apparatus for determining rates of change of weight, comprising in combination a weighing device having a part movable with the change of weight of the object to be weighed, a diaphragm on said movable part having a series of areas of equal light transparency and of uniform width, said areas being uniformly spaced from each other, a rotatable screw having a wide and deep thread with interstices between adjoining threads forming passages for the light similar in the manner of said areas on said diaphragm, a light source positioned so that the light from the source passes through the transparent areas of the diaphragm and through the interstices between the threads of said screw in a quantity dependent upon the overlap of the transparent areas and the interstices, a photocell positioned to receive the light from said light source after it has passed through said areas, means electrically connected to said photocell and responsive to changes in the electric output of said photocell and connected to said screw for rotating said screw and bringing into synchronism the rotation of the screw with the motion of the diaphragm, and further means connected to said responsive means for indicating the speed of rotation of said screw and thereby indicating the rate of change of weight on said weighing apparatus.

References Cited in the file of this patent

UNITED STATES PATENTS

| | | |
|---|---|---|
| 1,969,465 | Jones | Aug. 7, 1934 |
| 2,040,729 | DeCissey | May 12, 1936 |
| 2,083,701 | Fouquet | June 15, 1937 |
| 2,451,816 | Dunn | Oct. 19, 1948 |
| 2,541,915 | Culver | Feb. 13, 1951 |
| 2,622,868 | Yeasting | Dec. 23, 1952 |